United States Patent
Collins, Jr. et al.

[11] Patent Number: 5,315,097
[45] Date of Patent: May 24, 1994

[54] METHOD AND APPARATUS FOR OPERATING A TRIGGERLESS HAND-HELD OPTICAL SCANNER

[75] Inventors: Donald A. Collins, Jr.; Andrew B. Nye, III, both of Ithaca, N.Y.; Stephen J. Ames, New Concord, Ohio; David Houggy, Allentown, Pa.

[73] Assignee: NCR Corporation, Dayton, Ohio

[21] Appl. No.: 799,658

[22] Filed: Nov. 29, 1991

[51] Int. Cl.⁵ .............................................. G06K 7/10
[52] U.S. Cl. ................................ 235/472; 235/462; 235/455
[58] Field of Search ............... 235/462, 454, 455, 472, 235/383, 470, 436, 439; 250/555, 556, 566, 239

[56] References Cited

U.S. PATENT DOCUMENTS

| | | |
|---|---|---|
| 3,947,817 | 3/1976 | Requa et al. . |
| 4,118,687 | 10/1978 | McWaters et al. . |
| 4,354,101 | 10/1982 | Hester et al. . |
| 4,387,297 | 6/1983 | Swartz et al. ........................ 235/462 |
| 4,418,277 | 11/1983 | Tremmel et al. . |
| 4,575,625 | 3/1986 | Knowles ............................. 235/467 |
| 4,656,345 | 4/1987 | Kurimoto . |
| 4,672,215 | 6/1987 | Howard ............................. 235/472 |
| 4,766,297 | 8/1988 | McMillan ........................... 235/455 |
| 4,797,940 | 1/1989 | Sato et al. . |
| 4,879,456 | 11/1989 | Cherry et al. . |
| 4,956,783 | 9/1990 | Teranishi et al. ................... 235/472 |
| 4,971,410 | 11/1990 | Wuko, Jr. et al. ................. 235/472 |
| 5,010,242 | 4/1991 | Frontino . |
| 5,059,777 | 10/1991 | Wittensoldner et al. ........... 235/454 |
| 5,132,523 | 7/1992 | Bassett ............................... 235/472 |
| 5,136,147 | 8/1992 | Metlisky et al. ................... 252/462 |
| 5,180,904 | 1/1993 | Shepard et al. .................... 235/472 |

*Primary Examiner*—William L. Sikes
*Assistant Examiner*—Tai V. Duong
*Attorney, Agent, or Firm*—Paul W. Martin; Richard W. Lavin

[57] ABSTRACT

A method and apparatus for operating a hand-held bar code scanning device having a processor for operating the scanning device. The method includes the steps of mounting the scanning device in a support member, sensing the movement of the device when removed from the support member, operating the device when removed from the support member and disabling the scanning device when returned to the support member. A hand-held scanning device includes sensing means and processing means in which the sensing means outputs a control signal to the processing means upon sensing the movement of the scanner enabling the processing means to operate the scanner.

3 Claims, 10 Drawing Sheets

METHOD AND APPARATUS FOR OPERATING A TRIGGERLESS HAND-HELD OPTICAL SCANNER

CROSS REFERENCE TO RELATED APPLICATION

Bar Code Scanning Apparatus, co-pending U.S. patent application, Ser. No. 625,331 filed on Dec. 10, 1990, now U.S. Pat. No. 5,155,346, invented by Park Doing, Donald W. Carr and Charles K. Wike Jr., and assigned to the NCR Corporation.

Mode Switch For a Bar Code Scanning Apparatus, co-pending U.S. patent application Ser. No. 625,322 filed Dec. 10, 1990, invented by Jonathan Bassett, and assigned to the NCR Corporation.

BACKGROUND OF THE INVENTION

The present invention relates to optical bar code scanning systems and more particularly to a portable bar code scanner which doesn't require a hand operated trigger to initiate an operation of the bar code scanner.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales check out systems, the grocery industry has adopted an uniform product code (UPC) which is in the form of a bar code. Reading systems which have been constructed to read this type of bar code include hand-held wands which are moved across the bar code, and stationary optical scanning systems normally located within the cabinet structure of a checkout counter, in which the bar code is read when a purchased merchandise item is moved across a window in a counter constituting the scanning area of the counter. Other reading systems employ hand-held laser scanners which emit a single or multiple line scan pattern which are manually moved past the bar code label that is to be read. These prior bar code hand-held scanners employ a trigger mechanism which has to be actuated to initiate the operation of the scanner. It has been found that the use of such a trigger mechanism has led to hand fatigue in the operator increasing the occurrence of reading failures in the scanning operation.

SUMMARY OF THE INVENTION

In accordance with one embodiment of the invention, there is provided a portable bar code scanning system comprising a housing member having a recessed portion for receiving the head of a hand held bar code scanner for supporting the bar code scanner therein. The housing member further includes an extension portion on which is mounted a support member for supporting one end of the bar code scanning device. Mounted within the hand held scanner is a magnet which is positioned adjacent a magnetic sensor located within the holder. Removing the bar code scanner from the holder will cause the bar code scanner to be turned on and begin a timed scanning operation with the motor, the laser and the video circuitry operating. Upon expiration of the timed scanning operation, the scanner will turn off and look for a change in magnetic field intensity. If a valid read operation has occurred in the last timed scanner operation, then another timed scanner operation is initiated immediately. In a second embodiment of the invention, a motion detector device is mounted within the hand-held scanner which. Upon removal of the scanner from the holder, the bar code scanner is operated in the manner described above. In a third embodiment of the invention, a light sensing member is mounted within the bar code scanner. When positioned in the holder, the sensing member will detect the ambient light striking the scanner. Upon removal of the bar code scanner from the holder, the ambient light is removed by the hand of the operator in grasping the scanner enabling the light sensing member to initiate a scanning operation in the manner described above.

It is therefore a principal object of this invention to provide a portable optical bar code scanning apparatus which is automatically operated upon movement of the bar code scanner from a stationary position.

It is another object of this invention to provide a bar code scanning apparatus which does not require a manually operated trigger mechanism to initiate operation of the bar code scanner.

It is another object of this invention to provide a triggerless bar code scanning device which is simple in construction and therefore low in cost.

BRIEF DESCRIPTION OF THE DRAWINGS

These and other objects, features and advantages of the invention, as well as the invention itself, will become more apparent to those skilled in the art in light of the following detailed description taken into consideration together with the accompanying drawings wherein like reference numerals indicate like or corresponding parts throughout the several views and wherein.

DESCRIPTION OF THE PREFERRED EMBODIMENT

Figure 1A:
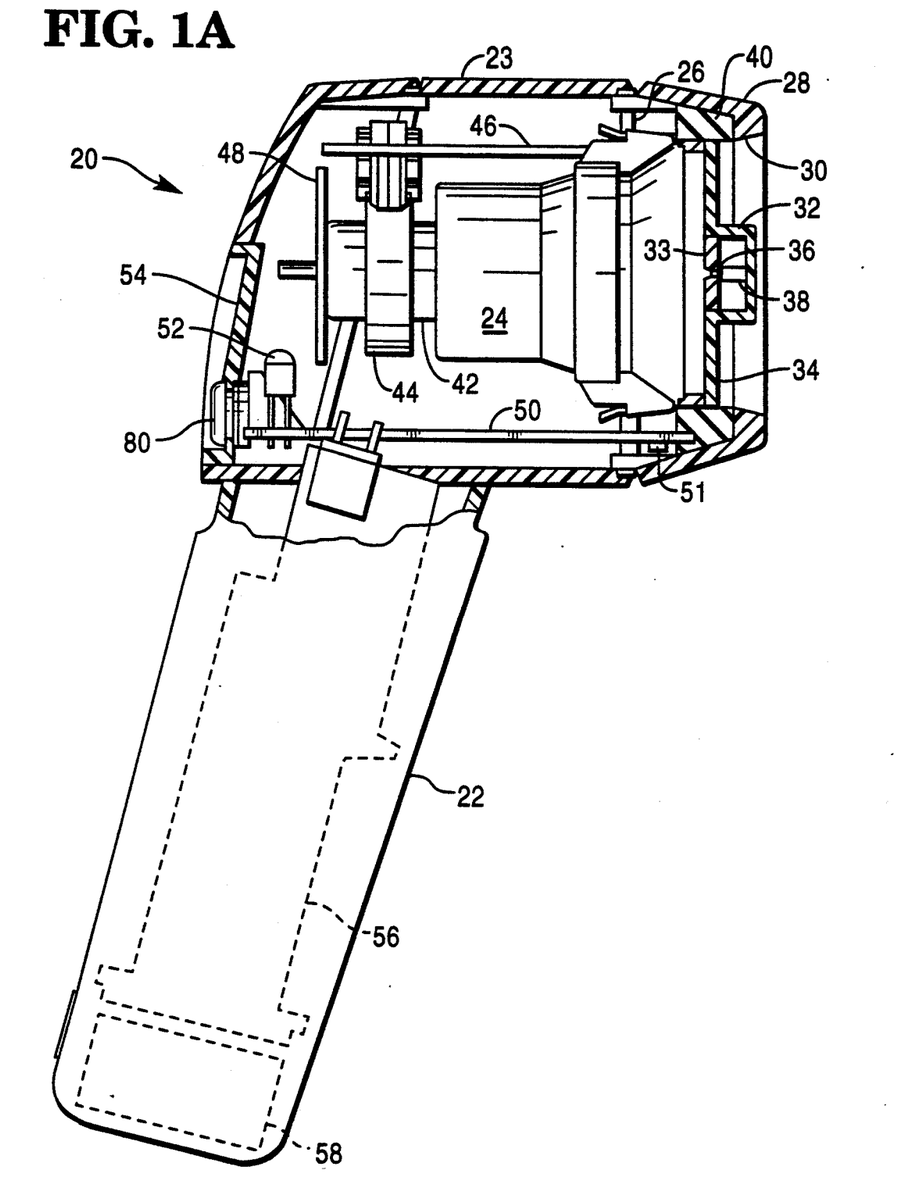
FIGS. 1A-C are partial side views of the hand-held bar code scanner of the present invention showing three embodiments of a sensing member used to operate the scanner of which only one will be used in a given scanner.
Figure 1B:
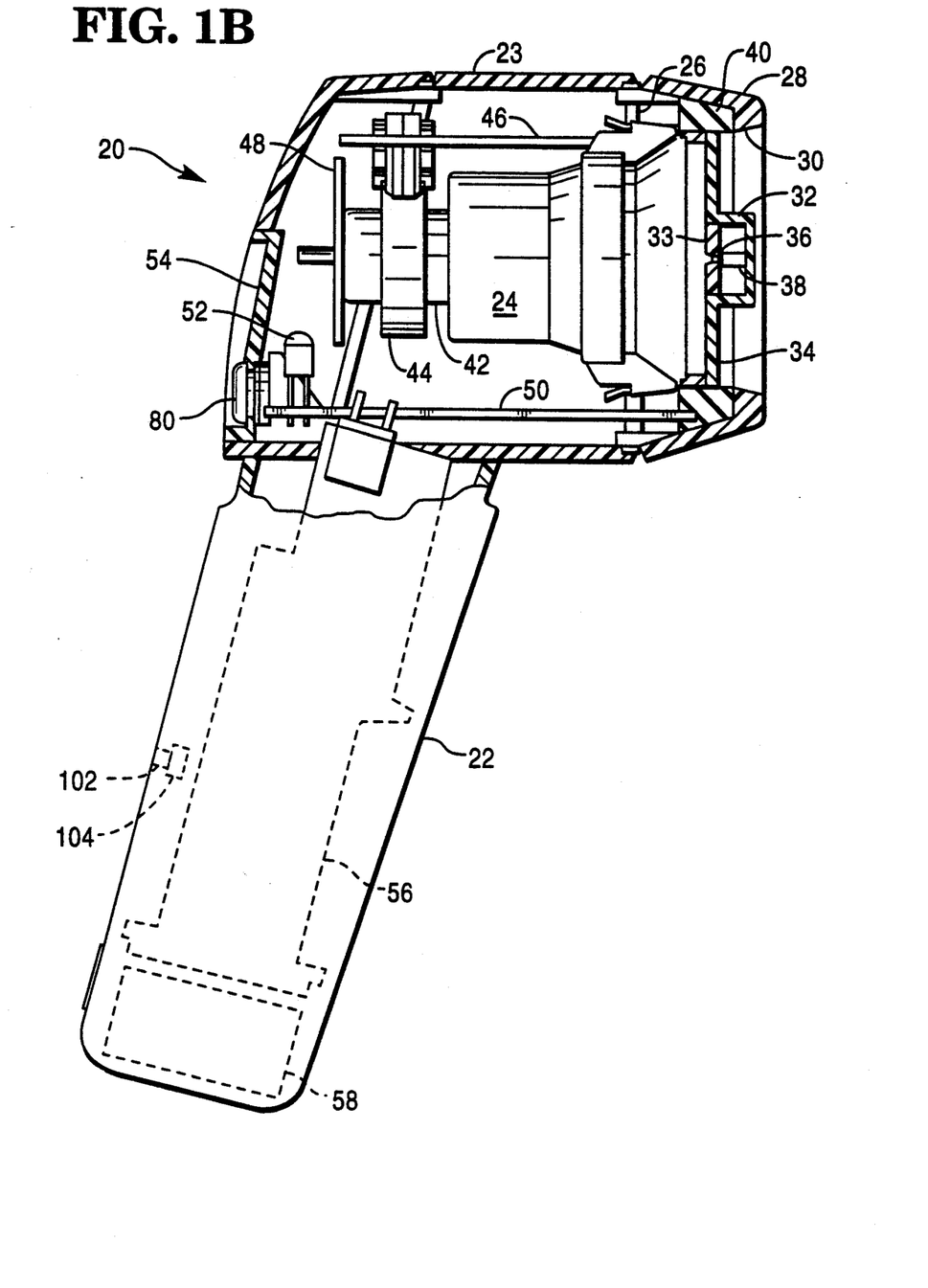
Figure 1C:
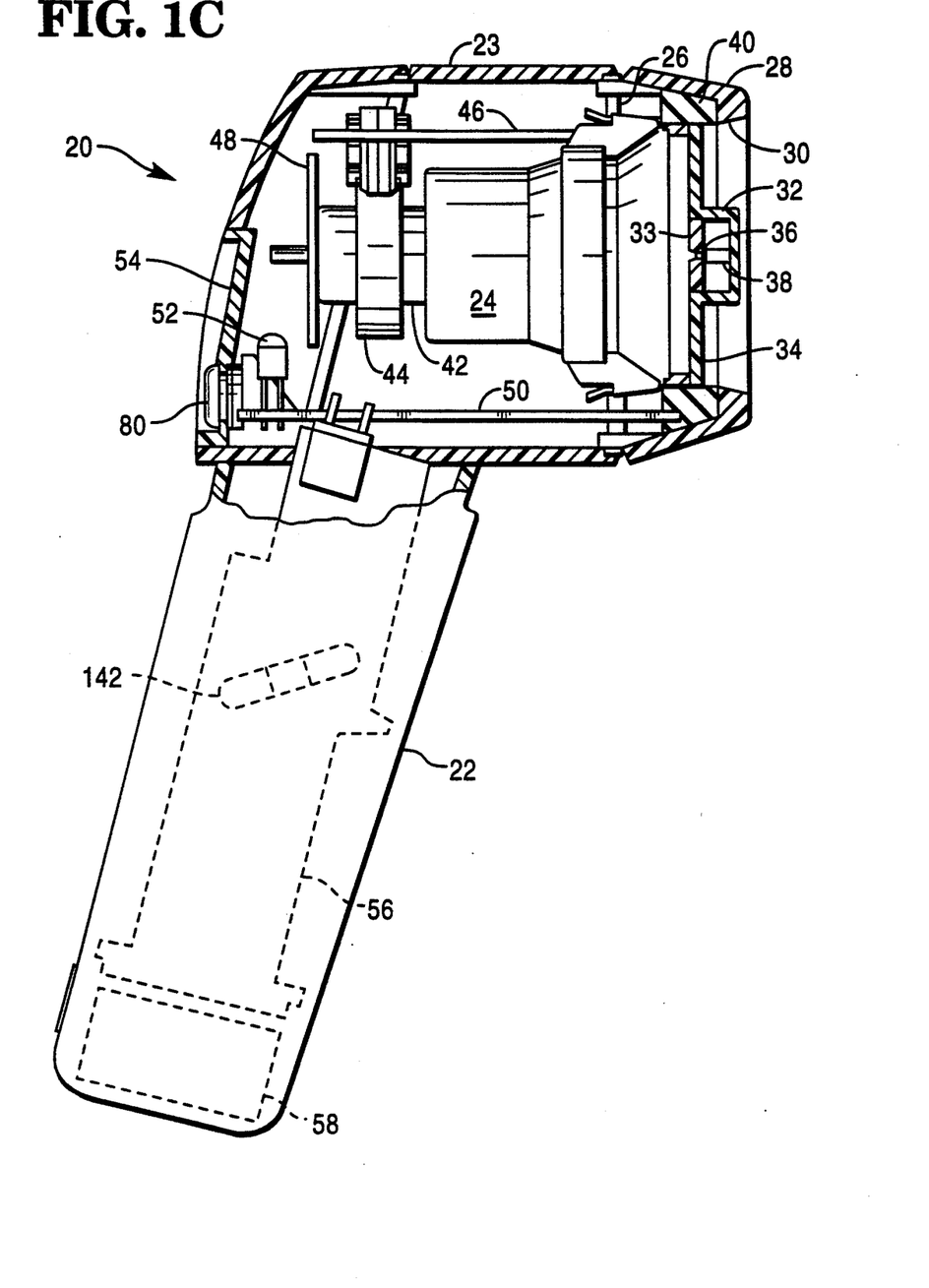

Referring now to FIGS. 1A-C, there is shown a partial side view of the hand-held bar code scanner of the present invention with a portion of the scanner removed for clarity. As shown, the hand-held scanner generally indicated by the numeral 20 comprises a handle portion 22 and a main body portion 23. The scanner 20 further includes a scanning unit 24 mounted within the main body portion 23 by means of a support ring 26, which in addition to supporting the scanning unit 24, also supports a cover member 28 having an opening 30 in which is positioned the housing portion 32 of a support member 34 containing a photodetector 36 and a holder 38. The cover member 28 may be constructed of a transparent material such as acrylic and is shock mounted with respect to the support member 34 by means of a ring of elastic foam material 40. Slidably mounted on a rear extension portion 42 of the scanning unit 24 is a bracket member 44 supporting a printed circuit board 46 which contains the video circuits associated with the operation of the scanning unit 24. The bracket member 44 may be constructed of a hard plastic material such as polycarbonate.

Secured to the rear edge of the extension portion 42 is a printed circuit board 48. Mounted along the lower edge of the main body portion 23 is a printed circuit board 50 which contains the digital interface logic circuits for controlling the processing of digital signals generated as a result of the operation of the scanning unit. For a complete description of the scanning unit 24, reference should be made to the U.S. Pat. No. 4,971,410 issued to Wike, Jr. et al., which is assigned to the assignee of the present invention and which is incorporated herein by reference.

Also secured to the printed circuit board 50 is a circuit board 56 located in the handle portion 22 of the scanner and which controls the power supplied to the scanning unit 24. Located in the lower edge of the handle portion 22 is a battery 58 which supplies power to the scanner.

Figure 2:
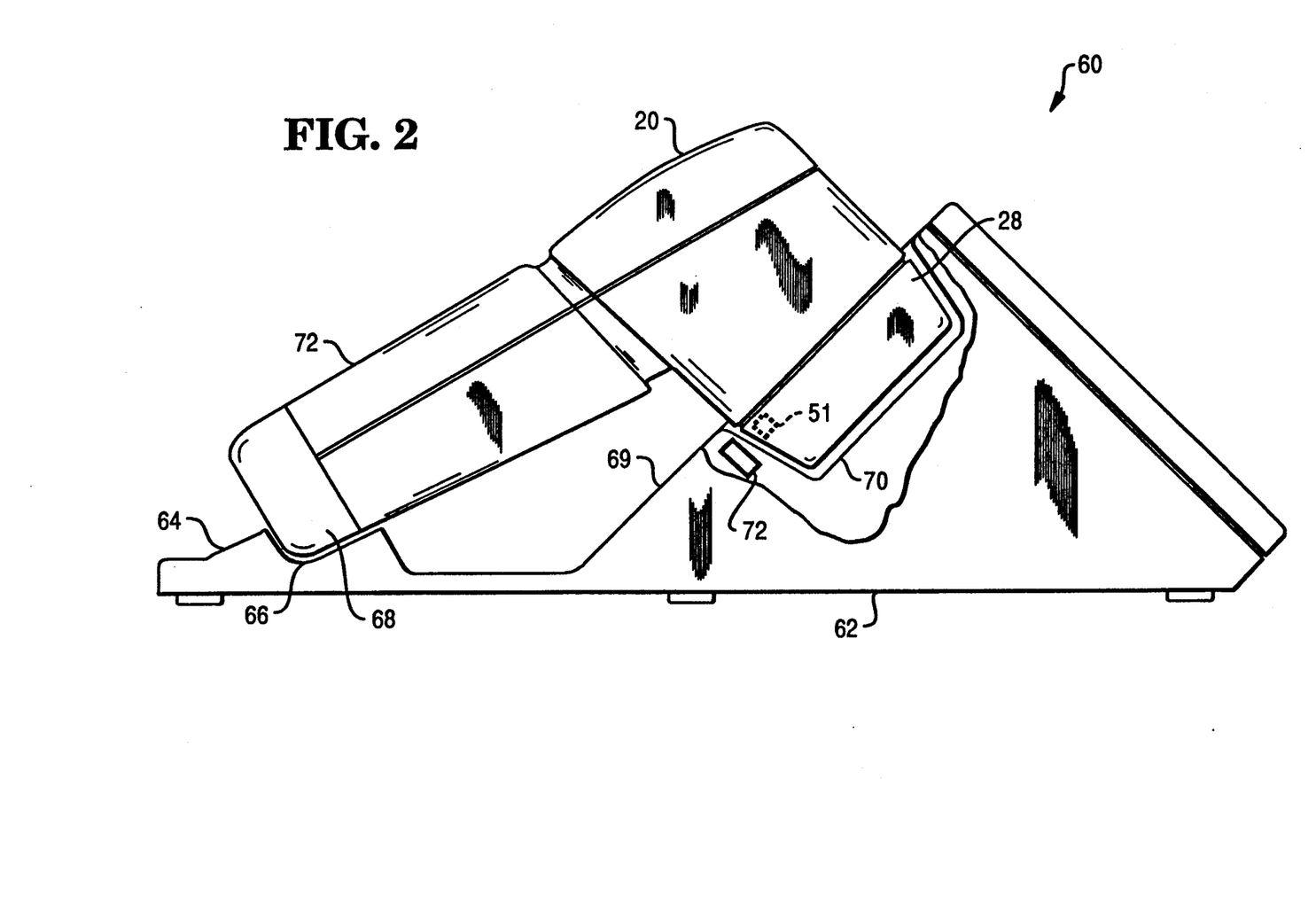
FIG. 2 is a right side elevational view of the bar code scanner mounted in a holder member in which a portion of the holder member is removed, showing details of the mounting of the scanner within the holder member and the location of the magnet within the holder member and the magnetic sensor within the scanner.
Figure 3:
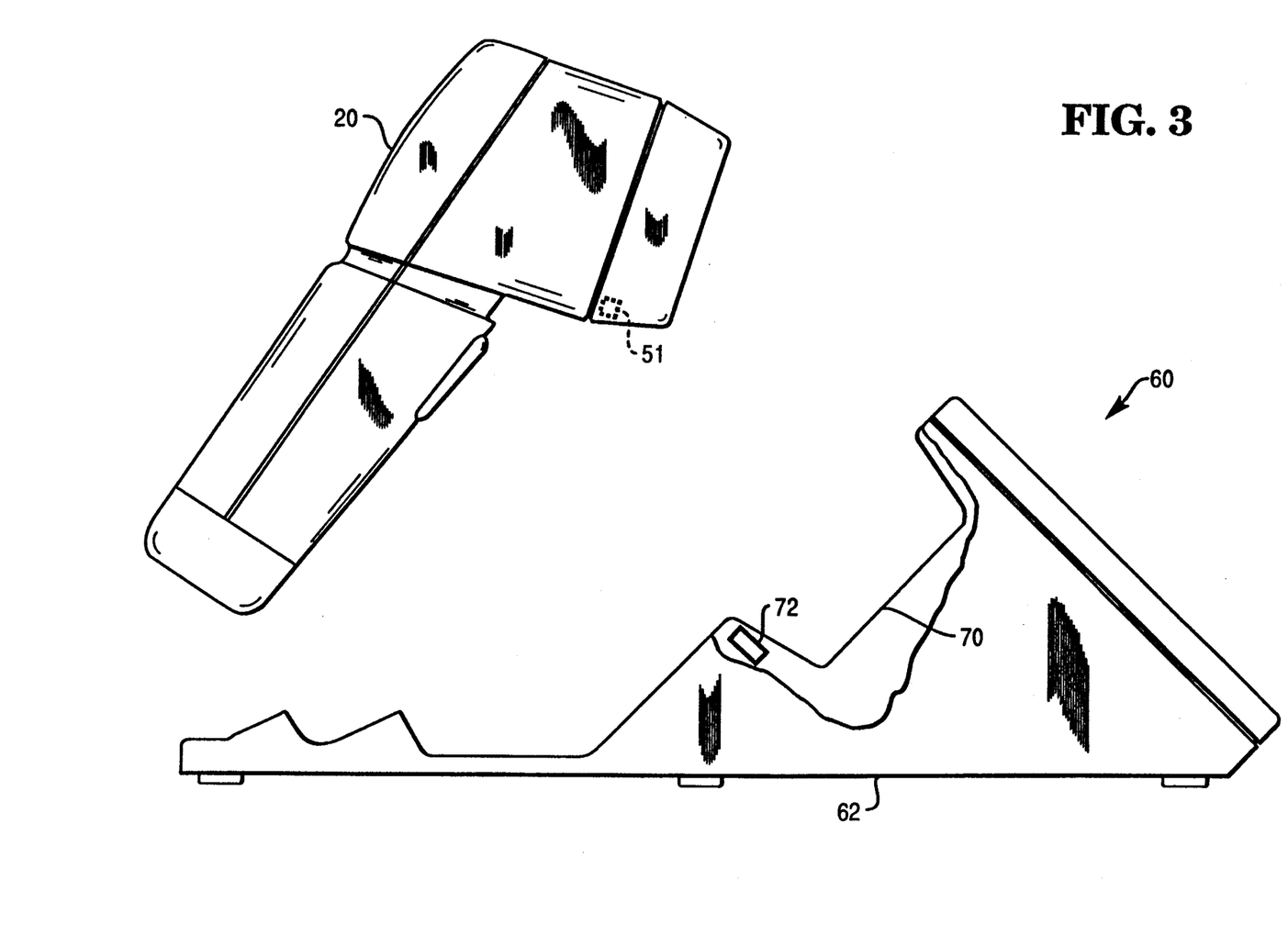
FIG. 3 is a view similar to FIG. 2, showing the scanner removed from the holder member.

Referring now to FIG. 2, there is shown a side view of the bar code scanner mounted within a support holder member generally indicated by the numeral 60 which comprises a front housing portion 62 and a rear housing portion 64 having a cut off portion 66 which accommodates the end portion 68 of the handle 72 of the bar code scanner 20. The front housing portion 62 includes a rear sloping surface 69 in which is located a recessed portion 70 which accommodates the cover member 28 of the bar code scanner 20. In one embodiment of the present invention, mounted in the head portion 28 of the bar code scanner 20 is a magnetic sensor or switch 51 (FIGS. 1A and 2) which may comprise a Hall sensor. An example of a Hall sensor that is commercially available is part no. UGN-3040T/U manufactured by the Sprague Electric Company of Concord, N.H. Mounted in the front housing portion 62 adjacent the recessed portion 70 is a magnet 72. As shown in FIG. 3, upon removal of the bar code scanner 20 from the recessed portion 70 of the front portion 62 of the housing member 60, the Hall sensor 51 will detect the removal of the magnetic energy generated by the magnet 72 thereby generating a control signal indicating the removal of the bar code scanner 20 from the housing member 60.

Figure 4:
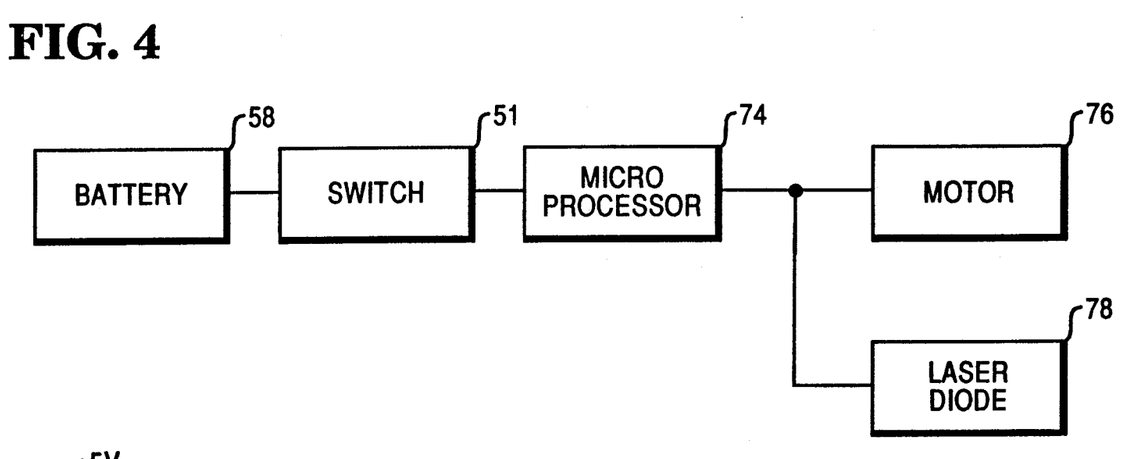
FIG. 4 is a block diagram of the operating system of the scanner.

Referring to FIG. 4, there is shown a system block diagram of the hand-held scanner 20 (FIGS. 1A-C and 2) which includes the battery 58, a microprocessor 74, the magnetic sensor or switch 51 coupled to the battery 58 and the microprocessor 74, a motor 76 located in the scanning unit 24 (FIG. 1A) which, when operated, will generate a scanning pattern and a laser diode 78 located in the rear extension portion 42 of the scanning unit 24 for generating scanning light beams when operated. Upon removal of the bar code scanner 20 from the housing member 60 (FIG. 3), the switch 51 will generate a control signal which is transmitted to the microprocessor 74. In response to receiving the control signal from a switch member 51, the microprocessor 74 will output control signals to the motor 76 and the laser diode 78 initiating a scanning operation.

Figure 5:
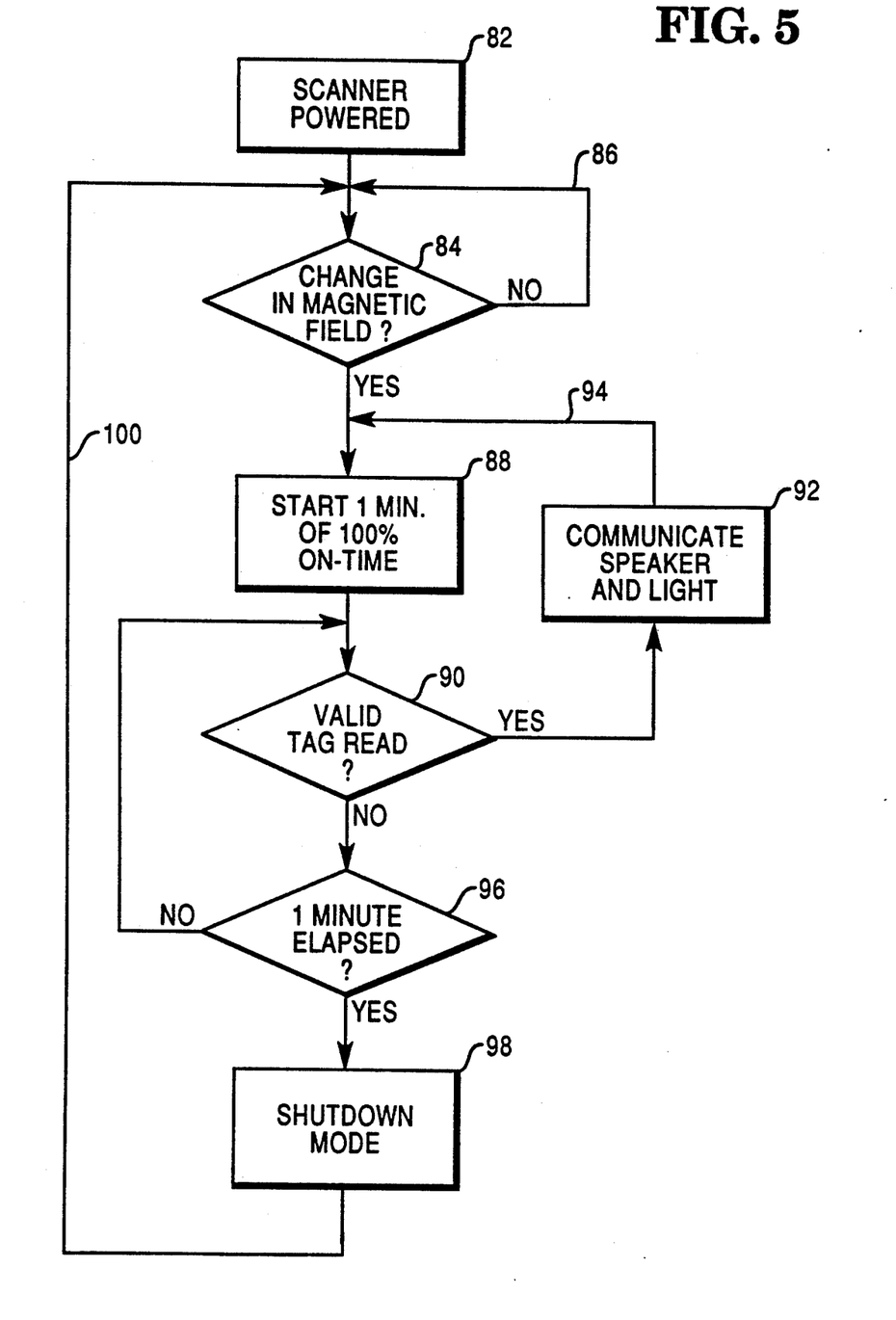
FIG. 5 is a flow diagram of one embodiment of the operating system of the scanner.

Referring now to FIG. 5, there is shown a flow diagram of the operation of the scanner embodiment of FIGS. 1A, 2 and 4. As shown in FIG. 1A, located in the rear portion of the housing member 23 is a button 80 which when depressed will allow the battery to supply power to the printed circuit boards 46, 48, 50 and 56 and also to the Hall sensor 51 and the microprocessor 54. The microprocessor will check to see if the scanner is powered (Block 82) and then check to see if there is a change in the magnetic field (Block 84) as evident by the presence or absence of a control signal generated by the Hall sensor 51. If there is no change in the magnetic field, the microprocessor will then return over line 86 and keep checking for the presence of a control signal generated by the Hall sensor. Upon detecting the presence of the control signal indicating there is a change in the magnetic field, the microprocessor will start a one minute operation of the scanner (Block 88) and then check to see if data has been received indicating that a valid tag read operation has occurred (Block 90). If a valid read operation has occurred, the microprocessor transmits the decoded tag information to a remote processing unit (not shown), will operate a speaker (not shown) located in the bar code scanner, and will operate the LED member 52 (FIG. 1A) indicating the occurrence of such a valid read operation (Block 92). The microprocessor will then proceed over path 94 and initiate a new one minute scanner operation (Block 88) and check to see if a valid tag read operation (Block 90) has occurred. If a valid tag read operation is not detected, the microprocessor will then check to see if one minute has elapsed (Block 96). If it has elapsed, the microprocessor will go into a shutdown mode (Block 98) and return over path 100 to block 84 for sensing a change in the magnetic field generated by the magnet 72. If one minute has not elapsed, the microprocessor will again check to see if a valid read operation has occurred (Block 90).

Referring now to FIG. 1B, there is shown a second embodiment of the present invention which comprises a light pipe 102 extending to the rear surface of the handle 22 in which the light pipe communicates with a light detector such as photodiode 104. As may be seen from FIG. 7, the photodiode 104 will generate a current which develops a voltage drop across the 1M resister 103, which voltage is transmitted over line 105 to the positive input of one-half of a TL082 Op-amplifier 106 which generates a reference voltage over line 108 to the negative input of a second TL082 Op-amplifier 110. When the optical scanner 20 is positioned within the support member 60 (FIG. 2), the photodiode 104 will generate a reference voltage upon detecting the ambient light present. This reference voltage is applied over line 108 to the negative input of the Op-amplifier 110. When there is a sudden change in the light level at the photodiode 104 as a result of the operator's hand grasping the handle 72 of the optical scanner 20 and removing the scanner from the support member 60, a potential difference is established between line 108 and line 112 enabling the Op-amplifier 110 to generate a turn on signal over line 114 to the microprocessor 74 (FIG. 4). As previously described, in response to receiving this turn on signal, the microprocessor will operate the motor 76 and the laser diode 78.

Figure 6:
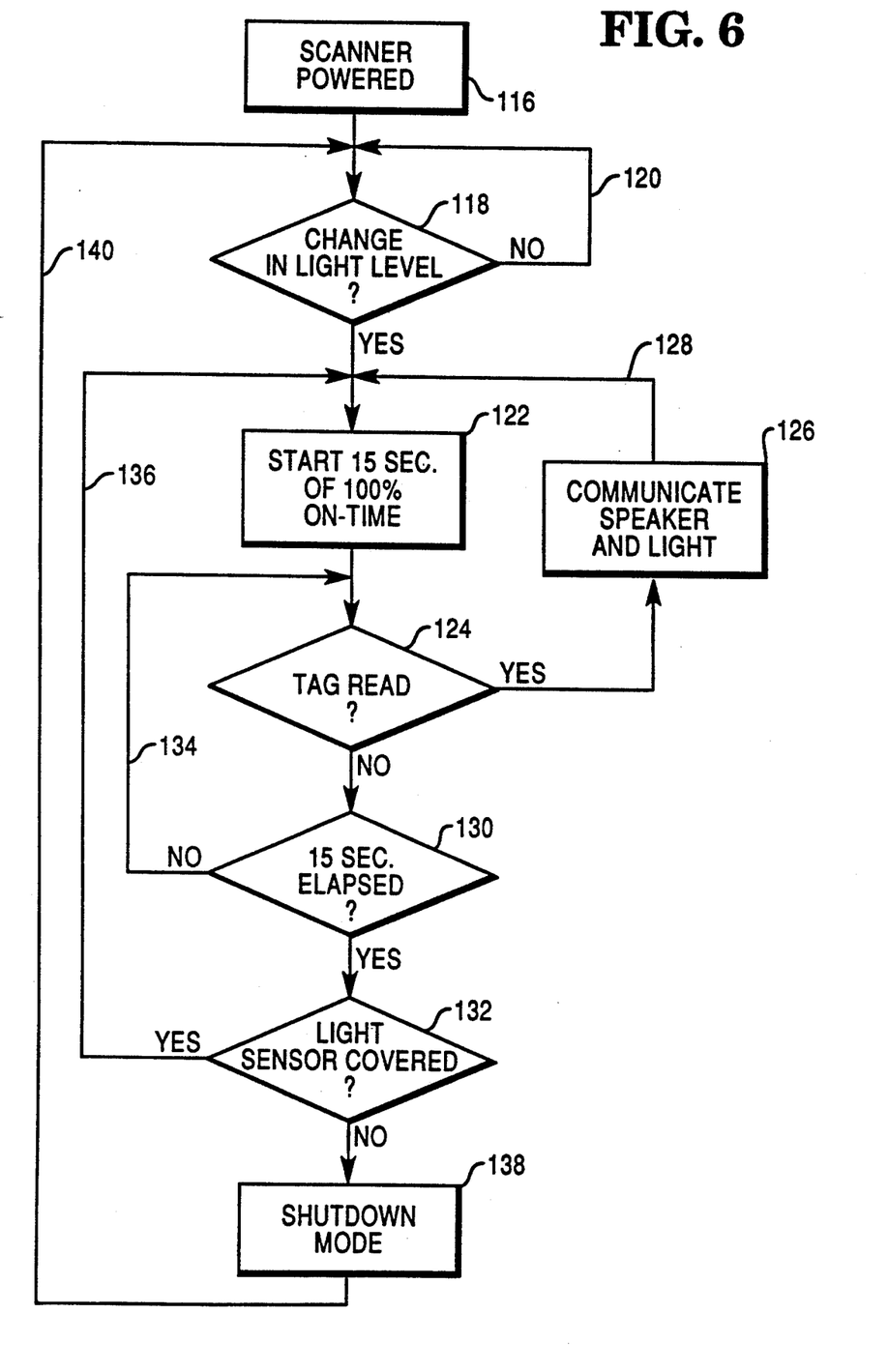
FIG. 6 is a flow diagram of a second embodiment of the operating system of the scanner.
Figure 7:
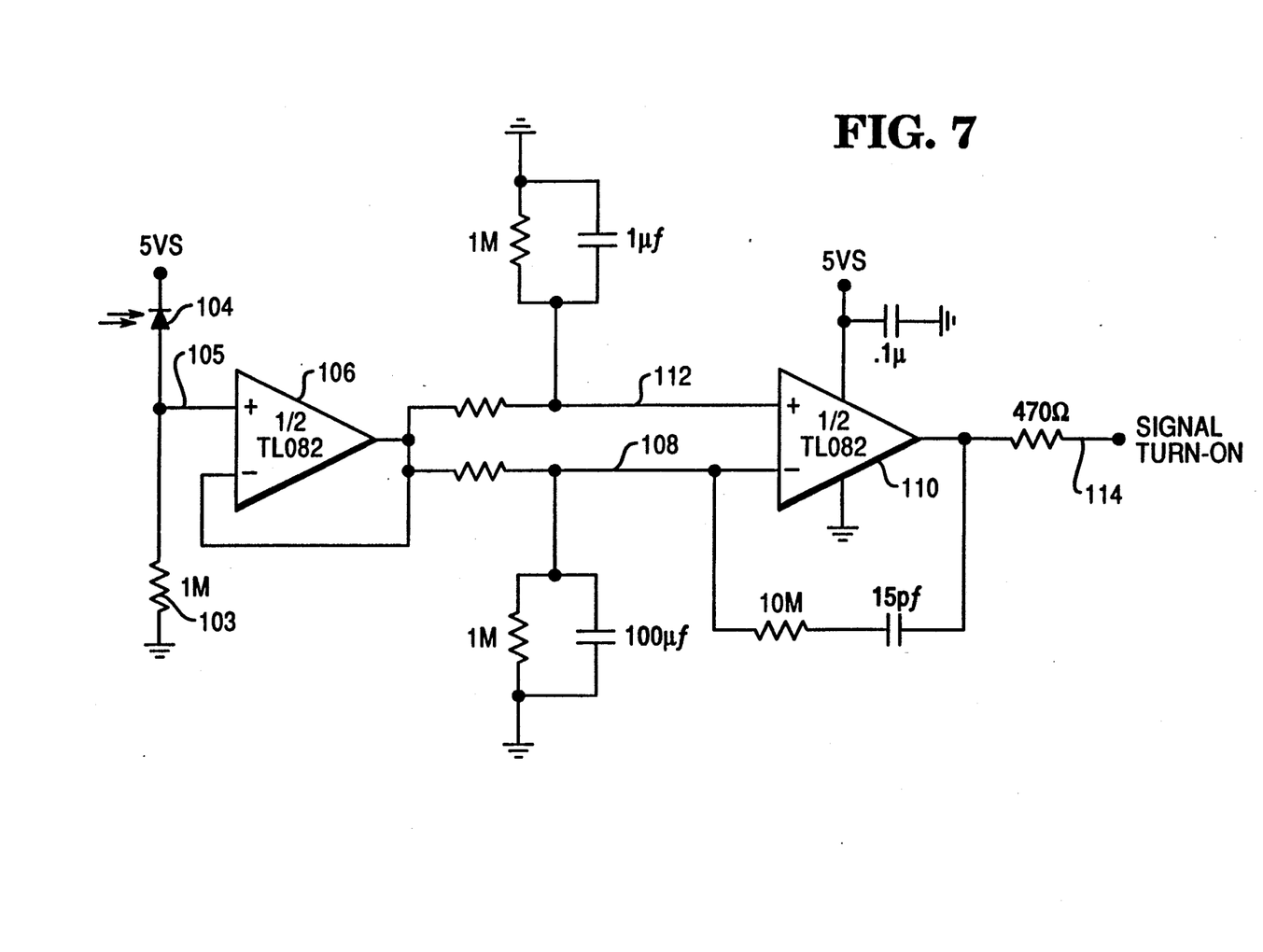
FIG. 7 is a schematic representation of a control circuit used in the embodiment of FIG. 6.

Referring now to FIG. 6 there is shown a flow diagram of the operation of the microprocessor 74 in sensing the occurrence of the turn on signal appearing on line 114 (FIG. 7). As previously described with respect to FIG. 5, the microprocessor will sense the power being applied to the hand held scanner (Block 116) upon actuation of the button 80 (FIG. 1A-C). The microprocessor will check to see if there is a change in light level (Block 118) as evidence by the signal appearing on line 114 (FIG. 7). If there is no change, the microprocessor will return over path 120 and repeat sensing a change in the light level (Block 118). Upon detecting the appearance of the signal over line 114, the microprocessor will then start a 15 second operation of the scanner (Block 122) and check to see if data is generated representing the successful reading of a bar code tag (Block 124). If it does detect a valid read operation, the microprocessor will transmit the decoded tag information to a remote processing unit (not shown), operate a speaker (not shown) and energize the LED member 52 (FIG. 1A-C) (Block 126) and return over path 128 to again start a 15 second operation of the scanner (Block 122). This sequence will continue until the microprocessor fails to detect a valid read operation, at which time it will check to see if the 15 second time operation has elapsed (Block 130). If the 15 second operation has not elapsed, the microprocessor will return over path 134 and again check to see if a valid read operation has occurred (Block 124). If the 15 second operation has elapsed, the microprocessor will detect the signal level appearing on line 114 to detect if the photodiode 104 is generating a signal level indicating that the scanner is being held by the operator (Block 132). If the photodiode is covered by the hand of the operator, the microprocessor will return over path 136 and again start the 15 second operation (Block 122). If the signal level on line 114 indicates that the photodiode 104 is sensing ambient light, the microprocessor will go into a shut down mode (Block 138) and return over path 140 to detect if there is any change in the light level sensed by the photodiode (Block 118).

Figure 8:
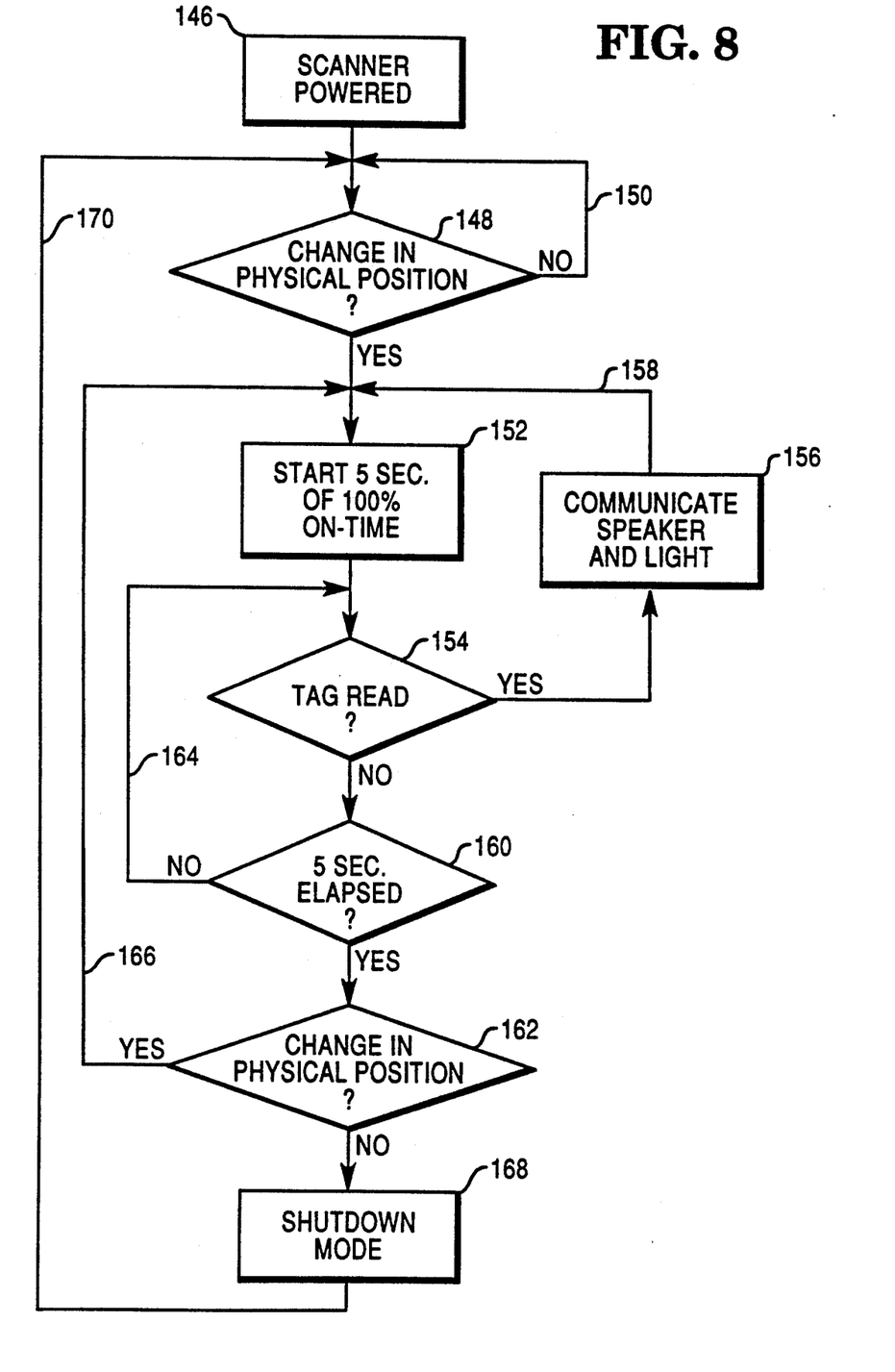
FIG. 8 is a flow diagram of a third embodiment of the operating system of the scanner.
Figure 9:
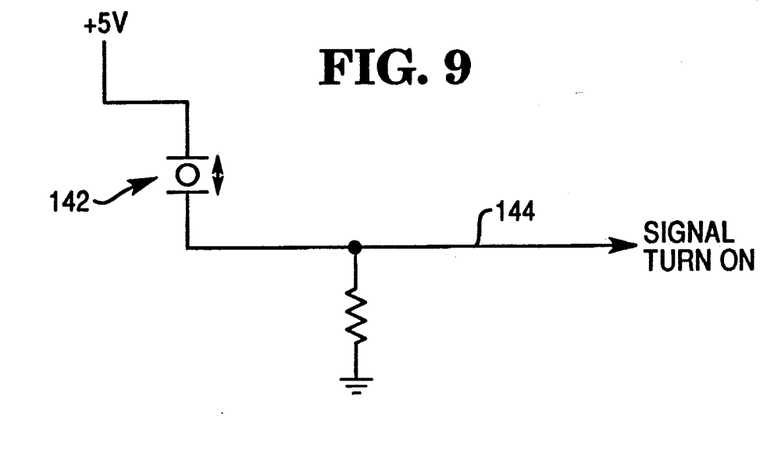
FIG. 9 is schematic representation of a control circuit used in the embodiment of FIG. 8.

Referring now to FIG. 1C, a third embodiment of the present invention includes the mounting of a mercury switch 142 in the handle 22 of the bar code scanner 20. As illustrated in FIG. 9, the mercury switch 142 is coupled to a 5 volt supply which is actuated upon movement of the handle enabling the 5 volt signal to appear on line 144 as the turn on signal which is transmitted to the microprocessor 74 (FIG. 4). As shown in the flow diagram of FIG. 8, the microprocessor will detect the occurrence of the power being supplied to the scanner (Block 146) and then will check the signal level appearing on line 144 (FIG. 9) to determine if there has been a change in the physical position of the hand-held scanner (Block 148) indicating movement of the hand-held scanner when removed from the support member 60 (FIG. 2). If there hasn't been a change, the microprocessor will return over path 150 and keep checking the signal level appearing on line 144 until the signal level rises to the 5 volt level, at which time it will start a 5 second scanner operation (Block 152) and then check to see if a valid read operation of the tag had occurred (Block 154). If it has, the microprocessor will operate the speaker (not shown) and the LED member 52 (Block 156) and return over path 158 to start a new 5 second scanner operation. This will be repeated until the microprocessor senses that a valid read operation has not occurred, at which time it will check to see if the 5 second scanner operation has elapsed (Block 160). If it has not elapsed, the microprocessor will return over path 164 and check to see if a valid read operation has occurred (Block 154). This will continue until the 5 second scanner operation elapses, at which time the microprocessor will check to see if the signal level on line 144 indicates a change in the physical position of the bar code scanner (Block 162). If it has, it will then return over path 166 and start a new 5 second scanner operation (Block 152). If there is no change in the position of the bar code scanner indicating that the bar code scanner has been replaced in the support member 60, the microprocessor will enter a shutdown mode (Block 168) disabling the operation of the scanner and return over path 170 to again check to see if there has been a change in the physical position of the scanner (Block 148). It will thus be seen that the position sensing embodiments disclosed in this application enable the hand-held scanner to be operated when removed from the support member.

Although the preferred embodiments of the present invention have been discussed herein, it is not intended that the invention be restricted thereto, but that it be limited only by the true spirit and scope of the appended claims.

What is claimed is:

1. A hand-held optical bar code scanner including a body portion and a handle portion comprising;
   a scanning unit for generating a scan pattern for scanning a bar code label;
   processing means mounted in said body portion for operating said scanning unit when enabled; and
   sensing means mounted in said handle portion and coupled to said processing means for sensing movement of the scanner, said sensing means outputting a control signal to said processing means upon sensing the movement of the scanner enabling said processing means to operate said scanner, said sensing means including a light detector mounted in the handle portion of the scanner for detecting the occurrence of the grasping of the handle of the bar code scanner by the operator, said light detector normally sensing the ambient light impinging on the scanner and outputting said control signal to said processing means upon the grasping of the handle portion by the hand of the operator which removes said ambient light from said light detector enabling the processing means to operate the scanner.

2. A method for operating an optical scanning device which includes the steps of:
   providing the optical scanning device with a handle portion for grasping by the hand of an operator;
   mounting the scanning device in a support member;
   mounting in the handle portion of the scanning device a light detector for sensing the grasping of the scanning device by the operator;
   sensing the grasping of the device by the operator in removing the scanner from the support member;
   operating the scanning device in response to sensing the grasping of the scanning device for scanning a bar code label;
   initiating a predetermined time of operation of the scanning device upon sensing the grasping of the scanning device;
   sensing the occurrence of a valid read operation during the operation of the scanning device; and disabling the operation of the scanning device upon sensing the release of said scanning device by the operator.

3. The method of claim 2, further comprising the steps of:

providing said scanning device with processing means coupled to said light detector for operating the scanning device when enabled;

sensing ambient light impinging on the said light detector; and outputting a control signal to said processing means by said light detector upon the grasping of the handle by the operator which removes said ambient light from said light detector enabling the processing means to operate the scanning device.

* * * * *